May 11, 1965  M. L. MIL ETAL  3,182,931
SINGLE-ROTOR HELICOPTER HAVING THE ROTOR
AXIS CANTED TO THE VERTICAL
Filed Dec. 30, 1963

INVENTORS
M. L. MIL
A. S. BRAVERMAN

BY
ATTORNEYS 3,182,931
SINGLE-ROTOR HELICOPTER HAVING THE
ROTOR AXIS CANTED TO THE VERTICAL
Mikhail Leontjevich Mil, Leningradskoje Chaussee 17,
Apt. 63, and Alexandr Samoilovich Braverman, Sokol-
nichesky Val 6, Korpus 2, Apt. 47, both of Moscow,
U.S.S.R.
Filed Dec. 30, 1963, Ser. No. 334,124
1 Claim. (Cl. 244—17.17)

This invention relates to aircraft, and more particularly to single-rotor helicopters.

It is known that to counterbalance the torque reaction of the main rotor in single-rotor helicopters a tail rotor is installed on the tail boom. However, in single-rotor helicopters of conventional design, the thrust of the tail rotor is less than the side thrust of the main rotor, with the difference in these forces tending to move the helicopter laterally.

Equilibrium of the forces acting along the lateral axis of the helicopter is obtained by banking or side-slipping the craft. Hovering flight of the helicopter is possible in the bank position only and as a consequence landing and take-off can be effected on and from one wheel only.

On an attempt by a pilot to level out the helicopter, the latter tends to move sideways. When on the ground (while "revving" the engine before take-off or during taxiing), the helicopter also tends to capsize.

Considerable banking at landing and take-off adds difficulties to the piloting of a single-rotor helicopter and provides serious problems for cargo-lifting helicopters in landing or take-off with the handled load while it is being hooked and unhooked.

In addition banked flight is disagreeable for the pilot, whereas side slipping flight is not efficient from the aerodynamic point of view since it increases drag on the helicopter fuselage.

Attempts have been made to decrease the bank and side slip angles by extending the tail rotor upwardly. This however failed to completely eliminate the bank since a high position of the tail rotor is inefficient from the constructional point of view.

It is also known that the displacement of the helicopter center of gravity sideways from the main rotor axis though diminishing the bank and side slip angles, involves, apart from the structural complications, a considerable increase of the deviation angle of the swash-plate assembly ring, of the blade flapping angles, and of the blade cyclic pitch range.

All attempts heretofore made to overcome these drawbacks in single-rotor helicopters have been unsatisfactory and an object of this invention is to provide a single-rotor helicopter having improved piloting characteristics which eliminate the bank at landing, take-off, and during level flight.

Another object of this invention is to provide a single-rotor helicopter with improved aerodynamic characteristics which avoid side slipping in level flight.

Still another object of this invention is to improve stability of the helicopter when on the ground.

Thus, in accordance with these and other objects, the invention consists in a new construction of a single-rotor helicopter, in which the axis of the main rotor is turned about the centers of gravity of the helicopter on the ground to a certain angle in a direction opposite to that of the thrust of the tail rotor.

It will be understood that various modifications in the construction may readily occur to those skilled in the art without departing from the spirit of the invention. Therefore, the description which follows suggests only a preferable, specific embodiment of the invention illustrated in connection with a cargo-carrying helicopter. The above and other objects and advantages of the invention will become more readily apparent from the following detailed description and the appended drawings in which.

Figure 2:
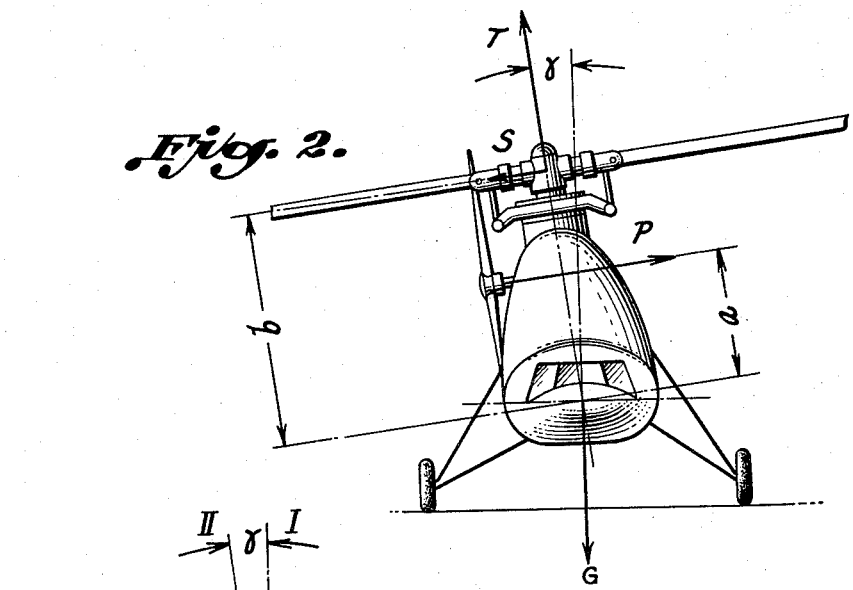
FIG. 2 is a view illustrating the forces acting on the helicopter in hovering flight; and, FIG. 3 is a front elevational view of the helicopter.

The forces which act on the helicopter are clearly shown in FIG. 2, wherein:

$T$ = rotor thrust
$S$ = side thrust of the main rotor (arises at deviation of the swash-plate assembly)
$P$ = tail rotor thrust
$G$ = helicopter weight
$a$ = distance from the center of gravity of the helicopter to the axis of the tail rotor
$b$ = distance from the center of gravity of the helicopter to the main rotor head
$\gamma$ = angle between the vertical and the main rotor axis (in case the head with spacing of flapping hinges is used the effective value of $b$ is greater than the designed one).

To completely eliminate the bank of the helicopter, the turning angle of the main rotor axis is so selected as to provide for equilibrium of the forces acting on the helicopter in hovering flight as is illustrated in the equation:

$$G = T \cos \gamma - S \sin \gamma + P \sin \gamma = T$$

$$T \sin \gamma + S \cos \gamma - P \cos \gamma = 0$$

$$Sb - Pa = 0$$

It appears from the system that assuming $\sin \gamma = T$ and cosine $\gamma = 1$, the inclination angle relative to a vertical line is $$\gamma = \frac{P}{G}\left(1 - \frac{a}{b}\right)$$

while for helicopters of conventional design, the angle $\gamma$ equals 2.5–1.5°.

Figure 1:
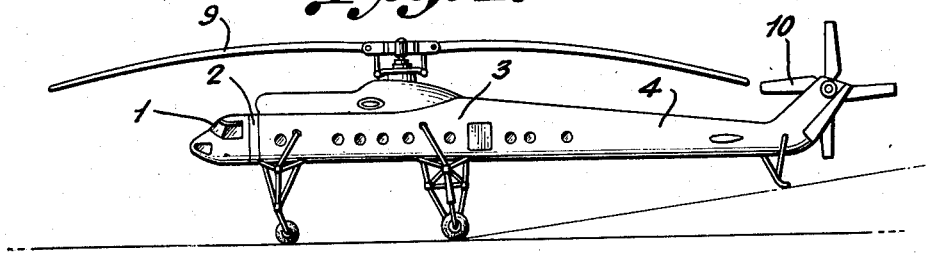
FIG. 1 is a side elevational view of a helicopter embodying the present invention.
Figure 3:
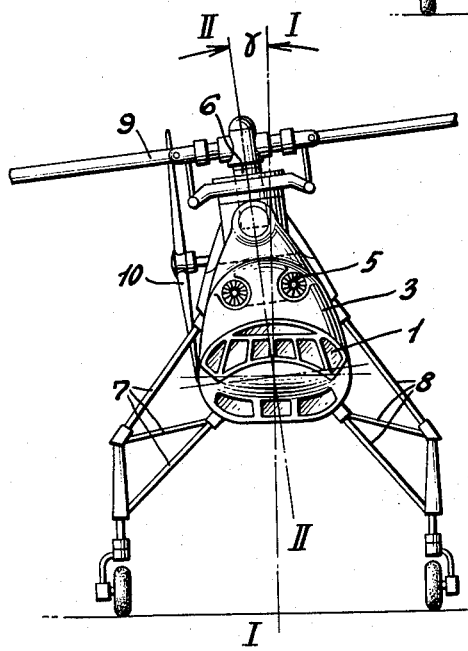

As shown in FIGS. 1 and 3, the helicopter includes a cockpit 1, means 2 connecting the cockpit to central section 3 of the fuselage and a tail section 4. A main rotor 9 is operably connected to a power unit 5 via shaft 6 and the tail section 4 is provided with a tail rotor 10. In FIG. 3 it will be noted that the cockpit 1 is turned through angle $\gamma$ relative to the fuselage and that the cockpit 1, central section 3 and tail section 4 are symmetrical. However, the plane of symmetry I—I of the cockpit is turned relative to the plane of symmetry II—II of the other sections of the fuselage through angle $\gamma$.

The helicopter is provided with landing gear 7, 8 which is so constructed and arranged that when the craft is on the ground, the central and tail sections 3 and 4 respectively together with the power unit 5 and the shaft 6 of the main rotor 9 are inclined to angle $\gamma$ from a vertical line in a direction opposite to that of the thrust of the tail rotor 10 while the cockpit 1 assumes a vertical position. This same position of the helicopter is also retained during flight. In order to effect the desired inclination of the craft, it will be seen that the landing gear struts are asymmetrical.

The invention is not to be confined to any strict conformity to the showings in the drawings but changes or modifications may be made therein so long as such changes or modifications mark no material departure from the spirit and scope of the appended claim.

What we claim is:

A single-rotor helicopter comprising a cockpit, a fuselage associated with the cockpit, a power unit symmetrically mounted within the fuselage, a main rotor, a tail rotor, and a landing gear assemblage on which the fuselage is mounted whereby the fuselage, power unit and main rotor are inclined relative to a vertical line in a direction opposite to the thrust developed by the tail rotor, said landing gear assemblage including asymmetrical left hand and right hand struts with said cockpit being positioned vertically when the fuselage is inclined to the plane of cockpit symmetry.

References Cited by the Examiner
UNITED STATES PATENTS

| | | | |
|---|---|---|---|
| 2,514,206 | 7/50 | Perry | 244—17.11 |
| 2,535,164 | 12/50 | Seibel | 244—17.11 |
| 3,038,685 | 6/62 | Hofmann | 244—17.17 |

FERGUS S. MIDDLETON, *Primary Examiner.*